United States Patent
Okanoue et al.

(10) Patent No.: US 6,754,291 B1
(45) Date of Patent: Jun. 22, 2004

(54) METHOD AND DEVICE OF OUTPUTTING DEMODULATION RESULT IN SOFT-DECISION DECODING AND RECEIVER

(75) Inventors: Kazuhiro Okanoue, Tokyo (JP); Takeshi Yamamoto, Tokyo (JP)

(73) Assignee: NEC Corp (JP)

( * ) Notice: Subject to any disclaimer, the term of this patent is extended or adjusted under 35 U.S.C. 154(b) by 0 days.

(21) Appl. No.: 09/523,844

(22) Filed: Mar. 13, 2000

(30) Foreign Application Priority Data

Mar. 12, 1999 (JP) .......................................... 11-066784

(51) Int. Cl.[7] .............................. H03D 1/00; H03K 9/00
(52) U.S. Cl. ........................ 375/341; 375/316; 375/340
(58) Field of Search ................................ 375/341, 340, 375/316, 260, 136, 147, 262, 149, 343; 370/35; 371/43

(56) References Cited

U.S. PATENT DOCUMENTS

| | | | | |
|---|---|---|---|---|
| 4,742,533 A | * | 5/1988 | Weidner et al. ................ | 375/85 |
| 5,425,037 A | * | 6/1995 | Uesugi et al. ................. | 371/43 |
| 5,764,690 A | * | 6/1998 | Blanchard et al. ........... | 375/206 |
| 5,907,583 A | * | 5/1999 | Sakoda et al. ............... | 375/260 |
| 6,411,610 B1 | * | 6/2002 | Li et al. ........................ | 370/35 |

FOREIGN PATENT DOCUMENTS

| | | |
|---|---|---|
| EP | 0716513 | 6/1996 |
| EP | 0887975 | 12/1998 |
| JP | 4-79615 | 3/1992 |
| JP | 8-8989 | 1/1996 |
| JP | 8-317006 | 11/1996 |
| JP | 10-257013 | 9/1998 |
| JP | 11-17760 | 1/1999 |
| JP | 2000-228655 | 8/2000 |

OTHER PUBLICATIONS

Mignone V. et al.: "CD3–OFDM: A new Channel Estimation Method to Improve the Spectrum Efficiency in Digital Terrestrial Television Systems" International Broadcasting Convention 1994, Sep. 14, 1995, XP000617513 *abstract*, *p. 122, col. 1, line 51–line 55*; *p. 125, col. 1, line 26–col. 2, line 12; figure 3*.

Sandell M. et al.: "Iterative Channel Estimation Using Soft Decision Feedback" IEEE Global Telecommunications Conference, U.S., New York, NY: IEEE, 1998 pp. 3728–3733, xp000805320; isbn: 0–7803–4985–7; *abstract*; *p. 3728, col. 1, line 22–line 32*; *p. 3728, col. 2, line 30–page 3729, col. 1, line 22; figure 1*.

* cited by examiner

*Primary Examiner*—Stephen Chin
*Assistant Examiner*—Sam K. Ahn
(74) *Attorney, Agent, or Firm*—Dickstein, Shapiro, Morin & Oshinsky, LLP

(57) ABSTRACT

A method of outputting a demodulation result for soft-decision decoding is provided, which is comprised of the steps of: (a) detecting a channel distortion of a received signal generated in a communication channel using a training signal contained in the received signal and a reference training signal, outputting a channel distortion data: (b) generating a distortion-based reliability data from the channel distortion data; (c) compensating the received signal using the channel distortion data, generating a compensated, received signal; (d) demodulating the compensated, received signal and deciding the received signal thus demodulated using a soft decision technique, outputting a decision result; and (e) outputting a demodulation result using the decision result and the distortion-based reliability data.

5 Claims, 6 Drawing Sheets

METHOD AND DEVICE OF OUTPUTTING DEMODULATION RESULT IN SOFT-DECISION DECODING AND RECEIVER

BACKGROUND OF THE INVENTION

1. Field of the Invention

The present invention relates to a method and a device of receiving digital signals and a receiver and more particularly, to a method and a device of outputting the demodulation result in soft-decision decoding that enhances the decoding capability of error-correcting codes, which makes it possible to output necessary reliability information with high accuracy, and a receiver using the method or device.

2. Description of the Prior Art

The soft-decision decoding technique is a technique that estimates the original digital signal from a noise-containing digital signal that has been sent through transmission lines by deciding the level of the noise-containing digital signal as a multi-valued signal (not a two-valued signal) using a plurality of threshold values. In other words, this technique is one that estimates the two-valued (i.e., "0" and "1"), original information through the multi-valued decoding by deciding the level of the noise-containing digital signal using a plurality of threshold values. This technique has an advantage that the error correction rate is better than that of the hard-decision decoding technology that estimates the two-valued, original information through the two-valued decoding by deciding the level of the noise-containing digital signal using a single threshold value.

An example of the prior-art soft-decision decoding systems is shown in the Japanese Non-Examined Patent Publication No. 8-317006 published in November 1996. In this system, the level reliability information on the basis of the received signal level and the phase reliability information on the basis of the received signal phase are used as the reliability information necessary for soft decision decoding. This prior-art system is explained below with reference to FIG. 1.

As shown in FIG. 1, the prior-art soft-decision decoding system comprises an input terminal 1000, a demodulation circuit 1001, a level detection circuit 1002, a level normalization circuit 1003, a soft-decision result calculation circuit 1004, a phase-reliability detection circuit 1006, and an output terminal 1005.

A received signal RS inputted through the input terminal 1000 is applied to the demodulation circuit 1001. The circuit 1001 demodulates the signal RS to generate a demodulated signal and then, decodes the demodulated signal using the soft-decision decoding technique. Thus, the circuit 1001 outputs a decision result, i.e., the demodulated data DD, to the level normalization circuit 1003, the soft-decision result calculation circuit 1004, and the phase-reliability detection circuit 1006.

The received signal RS is further applied to the level detection circuit 1002 and the phase-reliability detection circuit 1006. The level detection circuit 1002 detects the level of the signal RS thus applied and outputs a receiving level signal RSL to the level normalization circuit 1003. The level normalization circuit 1003 normalizes the level of the receiving level signal RSL on the basis of the decision result or demodulated data DD, outputting a receiving level reliability data LR. The "receiving level reliability" means the reliability relating to the receiving level of the received signal RS. The normalization operation of the circuit 1003 is necessitated by the following reason.

Since the decision result or demodulated data DD is a multi-valued demodulated data having different levels, the receiving level reliability is unable to be correctly estimated or evaluated from the receiving level itself. In other words, the receiving level reliability needs to be normalized.

On the other hand, the phase-reliability detection circuit 1006 detects the phase difference between the received signal RS and the demodulated data or decision result DD, outputting the level-based reliability data PR to the soft-decision result calculation circuit 1004.

The soft-decision result calculation circuit 1004 receives the demodulated data DD, the phase-based reliability data PR, and the level-based reliability data LR, outputting a demodulation data DR applicable to the subsequent decoding operation.

With the prior-art soft-decision decoding system shown in FIG. 1, normalization is essential for calculating the level-based reliability data LR on the basis of the decision result or demodulated data DD, which raises a problem that the circuit scale of the system becomes large.

Also, if the decision result or demodulated data DD is incorrect due to noise, there arises a problem that the reliability of the level-based reliability data LR, which is dependent upon the decision result DD, is lowered and as a result, the decoding capability of the error-correction codes degrades.

SUMMARY OF THE INVENTION

Accordingly, an object of the present invention is to provide a method and a device of outputting a demodulation result in soft-decision decoding that make it possible to output necessary reliability information with high accuracy using a simple circuit configuration.

Another object of the present invention is to provide a receiver having an enhanced decoding capability of error-correcting codes.

The above objects together with others not specifically mentioned will become clear to those skilled in the art from the following description.

According to a first aspect of the present invention, a method of outputting a demodulation result in soft-decision decoding is provided, which is comprised of the steps of:

(a) demodulating a received signal and deciding the received signal thus demodulated using a soft decision technique, outputting a decision result;

(b) estimating a distortion of the received signal generated in a communication channel, outputting a channel distortion data; and (c) calculating a demodulation result on the basis of the decision result and the channel distortion data.

With the method of outputting a demodulation result in soft-decision decoding according to the first aspect, the distortion of the received signal generated in the communication channel is estimated to output the channel distortion data and then, the demodulation result is calculated on the basis of the decision result and the channel distortion data. This means that the channel distortion data (instead of the level of the received signal) is used as the level reliability information. Thus, the level reliability information can be obtained independent of the decision result, which simplifies the circuit configuration.

As a result, the necessary reliability information can be outputted with high accuracy using a simple circuit configuration.

According to a second aspect of the present invention, another method of outputting a demodulation result in soft-decision decoding is provided, which is comprised of the steps of:

(a) detecting a channel distortion of a received signal generated in a communication channel using a training signal contained in the received signal and a reference training signal, outputting a channel distortion data;

(b) generating a distortion-based reliability data from the channel distortion data;

(c) compensating the received signal using the channel distortion data, generating a compensated, received signal;

(d) demodulating the compensated, received signal and deciding the received signal thus demodulated using a soft decision technique, outputting a decision result; and (e) outputting a demodulation result using the decision result and the distortion-based reliability data.

With the method of outputting a demodulation result in soft-decision decoding according to the second aspect, the channel distortion of the received signal generated in the communication channel is detected using the training signal contained in the received signal and the reference training signal. Also, the distortion-based reliability data is generated from the channel distortion data of the received signal. The received signal is compensated using the channel distortion data to thereby generate the compensated, received signal. Using the compensated, received signal, the decision result is generated. Thus, the channel distortion data (instead of the level of the received signal) of the received signal is used as the level reliability information.

As a result, the level reliability information can be obtained independent of the decision result and therefore, the necessary reliability information can be outputted with high accuracy using a simple circuit configuration.

According to a third aspect of the present invention, a device of outputting a demodulation result in soft-decision decoding is provided, which is comprised of:

(a) a demodulator means for demodulating a received signal and for deciding the received signal thus demodulated using a soft decision technique, outputting a decision result;

(b) a channel distortion estimator means for estimating a distortion of the received signal generated in a communication channel, outputting a channel distortion data to the demodulator means; and (c) a demodulation result calculator means for calculating a demodulation result on the basis of the decision result from the demodulator means and the channel distortion data from the channel distortion estimator means.

With the device of outputting a demodulation result in soft-decision decoding according to the third aspect, because of the same reason as that of the method according to the first aspect, the necessary reliability information can be outputted with high accuracy using a simple circuit configuration.

According to a fourth aspect of the present invention, another device of outputting a demodulation result in soft-decision decoding is provided, which is comprised of:

(a) a channel distortion detector means for detecting a channel distortion of a received signal generated in a communication channel using a training signal contained in the received signal and a reference training signal, outputting a channel distortion data;

(b) a distortion-based reliability data generator means for generating a distortion-based reliability data from the channel distortion data;

(c) a compensator means for compensating the received signal using the channel distortion data, generating a compensated, received signal;

(d) a demodulator means for demodulating the compensated, received signal and deciding the received signal thus demodulated using a soft decision technique, outputting a decision result; and (e) a demodulation result output means for outputting a demodulation result using the decision result and the distortion-based reliability data.

With the device of outputting a demodulation result in soft-decision decoding according to the fourth aspect, because of the same reason as that of the method according to the second aspect, the necessary reliability information can be outputted with high accuracy using a simple circuit configuration.

According to a fifth aspect of the present invention, a receiver is provided, which is comprised of:

(a) a demodulation circuit for outputting n decision results corresponding to n frequency-multiplexed sub-carriers of a received signal by demodulating the n sub-carriers and deciding then sub-carriers thus demodulated using a soft decision technique, where n is an integer greater than unity;

the n decision results being generated by using n channel-distortion coefficients corresponding to the n sub-carriers;

(b) a channel-distortion calculation circuit for calculating the n channel-distortion coefficients corresponding to the n sub-carriers;

(c) a reliability information calculation circuit for calculating reliability information for the n decision results corresponding to the n sub-carriers using the n channel-distortion coefficients; and (d) a demodulation result output circuit for outputting a demodulation result using the n decision results corresponding to then sub-carriers and the reliability information corresponding to the n sub-carriers.

With the receiver according to the fifth aspect, because of substantially the same reason as that of the method according to the first aspect, an enhanced decoding capability of error-correcting codes can be realized.

In a preferred embodiment of the receiver according to the fifth aspect of the invention, the channel-distortion circuit comprises;

a training signal point memory for storing training signal points corresponding to n reference training signal points corresponding to the n sub-carriers; and n division circuits for respectively dividing n training signal points of the n sub-carriers by the n reference training signal points to thereby output the n channel-distortion coefficients.

In another preferred embodiment of the receiver according to the fifth aspect of the invention, the reliability information calculator circuit comprises;

n level detection circuits for detecting the level of the n channel-distortion coefficients;

a threshold memory for storing threshold values for quantizing the reliability with respect to the level of the n channel-distortion coefficients; and n quantization circuits for quantizing outputs of the n level detection circuits using the threshold values, thereby outputting reliability information corresponding to then decision results.

In still another preferred embodiment of the receiver according to the fifth aspect of the invention, the demodulation circuit outputs the n decision results corresponding to the n sub-carriers and n pieces of distance reliability information as reliability information for the n decision results.

In a further preferred embodiment of the receiver according to the fifth aspect of the invention, the demodulation circuit comprises;

n multiplier circuits for multiplying the n sub-carriers by the corresponding n channel-distortion coefficients;

n decision circuits for outputting the n decision results by demodulating the n sub-carriers and outputs of the n multiplier circuits;

n distance calculation circuits for calculating a distance between the n decision results and the outputs of the n multiplier circuits in a signal space;

a threshold memory for storing threshold values for quantizing the outputs of the n distance calculation circuits; and n quantization circuits for quantizing the outputs of the n distance calculator circuits using the threshold values stored in the threshold memory and the outputs of then distance calculator circuits, thereby outputting distance reliability information as the reliability information for the n decision results.

BRIEF DESCRIPTION OF THE DRAWINGS

In order that the present invention may be readily carried into effect, it will now be described with reference to the accompanying drawings.

DETAILED DESCRIPTION OF THE PREFERRED EMBODIMENTS

Figure 1:
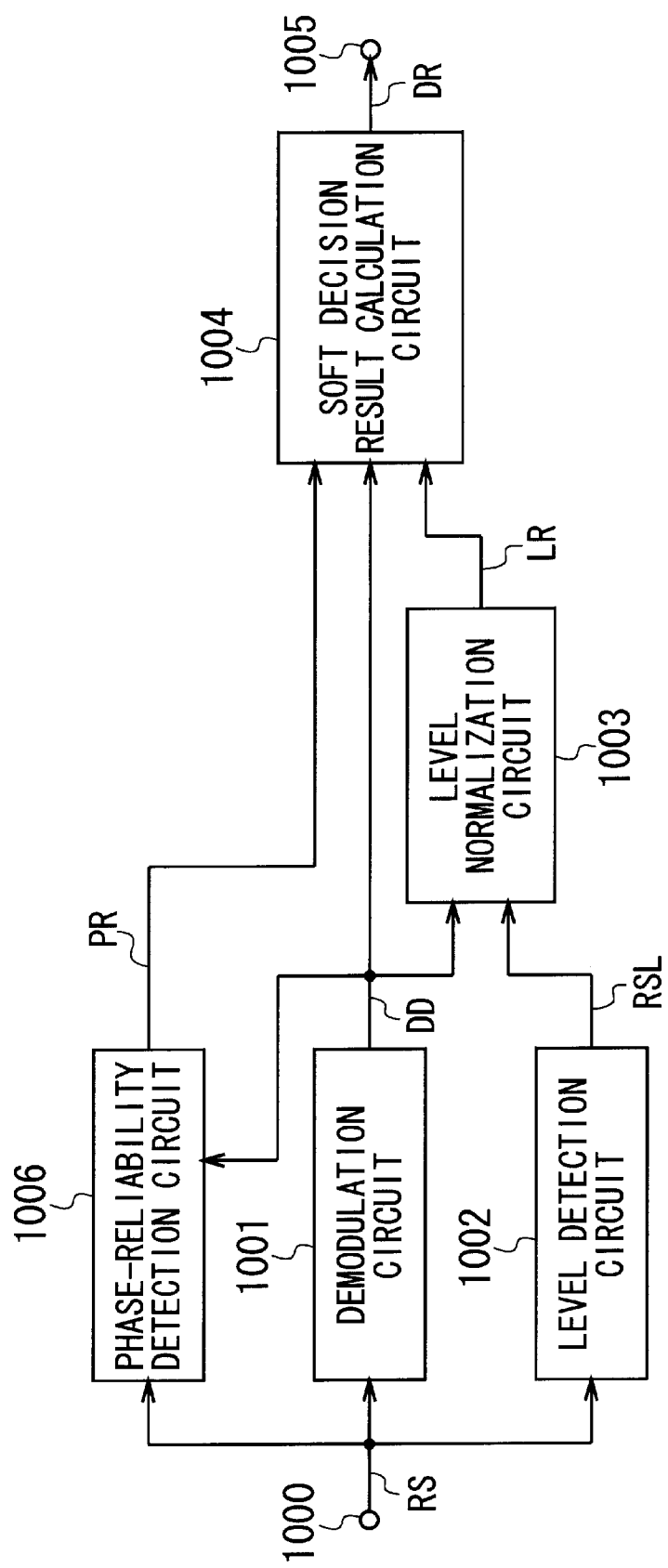
FIG. 1 is a functional block diagram showing the configuration of a prior-art device of outputting a demodulation result in soft-decision decoding.

Preferred embodiments of the present invention will be described in detail below while referring to the drawings attached.

First Embodiment

Figure 2:
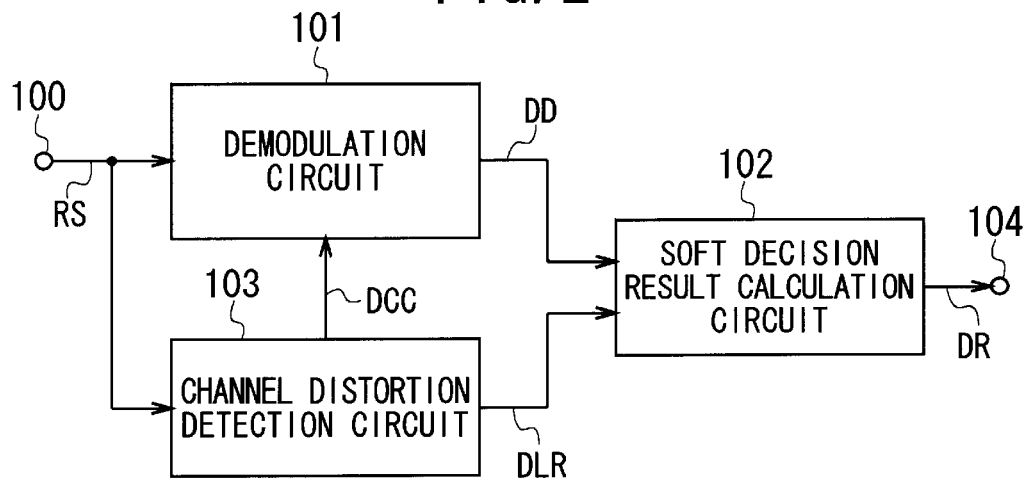
FIG. 2 is a functional block diagram showing the configuration of a device of outputting a demodulation result in soft-decision decoding according to a first embodiment of the invention.

A device of outputting a demodulation result in soft-decision decoding according to a first embodiment of the invention has the configuration as shown in FIG. 2.

As shown in FIG. 2, the device according to the first embodiment comprises an input terminal 100, a demodulation circuit 101, a soft-decision result calculation circuit 102, a channel distortion detection circuit 103, and an output terminal 104.

A received signal RS in burst mode is inputted into the device through the input terminal 100. The received signal RS is commonly supplied to the demodulation circuit 101 and the channel distortion detection circuit 103.

The channel distortion detection circuit 103 detects the distortion occurring in the communication channels from the training signal contained in the received signal RS and a reference training signal, outputting a channel distortion data DCC to the demodulation circuit 101. Also, on the basis of the channel distortion data DCC thus obtained, the circuit 103 generates a reliability data DLR and outputs it to the soft-decision result calculation circuit 102.

The demodulation circuit 101 compensates the received signal RS using the channel distortion data DCC from the circuit 103 and then, generates a decision result DD from the received signal RS thus compensated using the soft-decision technique. Then, the circuit 101 outputs the decision result DD to the soft-decision result calculation circuit 102.

The soft-decision result calculation circuit 102 receives the decision result DD from the demodulation circuit 101 and the channel distortion data DLR from the channel distortion detection circuit 103, thereby outputting a demodulation result DR toward the output terminal 104 for the subsequent decoding operation.

Figure 3:
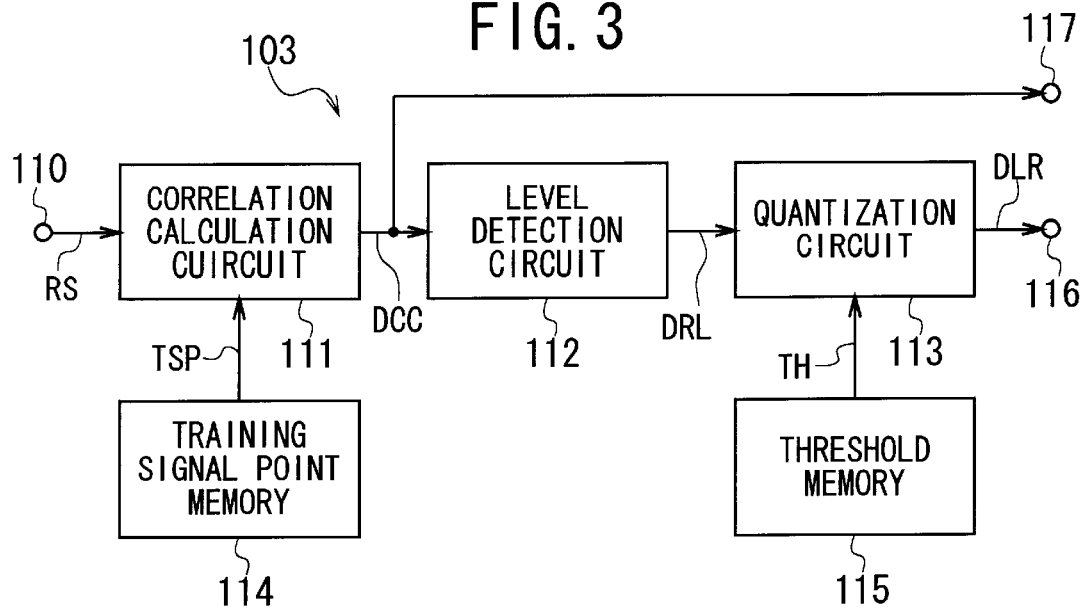
FIG. 3 is a functional block diagram showing the configuration of the communication channel distortion detection circuit used in the device according to the first embodiment of FIG. 2.

FIG. 3 shows an example of the configuration of the channel distortion detection circuit 103 used in the device of FIG. 2.

As shown in FIG. 3, the channel distortion detection circuit 103 comprises a correlation calculation circuit 111, a level detection circuit 112, a quantization circuit 113, a training signal point memory 114, and a threshold memory 115. An input terminal 110 is connected to the input of the correlation calculation circuit 111. An output terminal 116 is connected to the output of the quantization circuit 113. Another output terminal 117 is connected to the output of the correlation calculation circuit 111.

The output terminal 116 is further connected to the input of the soft-decision result operation circuit 102. The output terminal 117 is further connected to the input of the demodulation circuit 101.

The received signal RS is applied to the correlation calculation circuit 111 through the input terminal 110. The circuit 111 calculates the correlation between the training signal contained in the received signal RS and a reference training signal that has been stored in the training signal memory 114 in advance, outputting a distortion-compensating coefficient DCC to the level detection circuit 112. The distortion-compensating coefficient DCC is sent to the demodulation circuit 101 through the output terminal 117. The distortion-compensating coefficient DCC means the distortion of the signal RS encountered in the communication channels.

The level detection circuit 112 detects the level of the applied distortion-compensating coefficient DCC. The smaller the channel distortion becomes, the higher the correlation between the previously-stored reference training signal and the reference signal in the received signal RS (and therefore, the reliability level) becomes also.

The correlation or reliability level DRL obtained in the level detection circuit 112 is quantized by the quantization circuit 113 using the threshold values TH stored in the threshold memory 115. Thus, the circuit 113 outputs the reliability information DLR to the soft-decision result operation circuit 102 through the output terminal 116 on the basis of the channel distortion.

Figure 4:
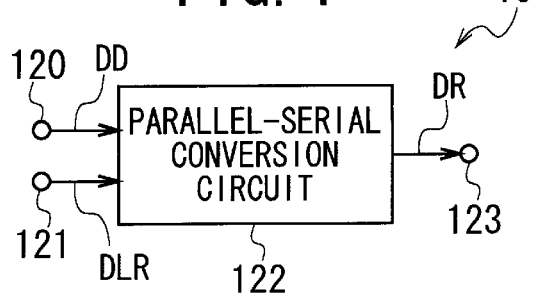
FIG. 4 is a functional block diagram showing the configuration of the soft-decision result operation circuit used in the device according to the first embodiment of FIG. 2.

FIG. 4 shows an example of the configuration of the soft-decision result calculation circuit 102 used in the device of FIG. 2.

As shown in FIG. 4, the soft-decision result calculation circuit 102 is formed by a parallel-serial conversion circuit 122. An input terminal 120 is connected to the input of the demodulating circuit 110. Another input terminal 121 is connected to the output of the channel-distortion detection circuit 103.

The parallel-serial conversion circuit 122 is supplied with the decision result DD from the demodulation circuit 101 through the input terminal 120 and the reliability data DLR from the channel distortion detection circuit 103 through the input terminal 121. Then, the circuit 122 outputs the demodulation result DR for the subsequent decoding operation to the output terminal 123 or 104. The circuit 122 converts the two data DD and DLR supplied in parallel to a serial signal as the demodulation result DR.

With the device of outputting a demodulation result in soft-decision decoding according to the first embodiment of the invention, the distortion of the received signal RS generated in the communication channels is detected from the training signal contained in the received signal RS and the reference training signal stored in the training signal point memory 114. Also, the distortion-based reliability data DLR is generated from the channel distortion of the received signal RS in the channel distortion detection circuit 103. The signal RS is compensated using the channel distortion to thereby generate the compensated, received signal. The compensated, received signal is demodulated by the demodulation circuit 101 and soft-decided, generating the decision result DD. Thus, the channel distortion data DCC (instead of the level of the received signal RS) is used as the level reliability information.

As a result, the level reliability information can be obtained independent of the decision result DD and therefore, the necessary reliability information can be outputted with high accuracy using a simple circuit configuration.

Second Embodiment

Figure 5:
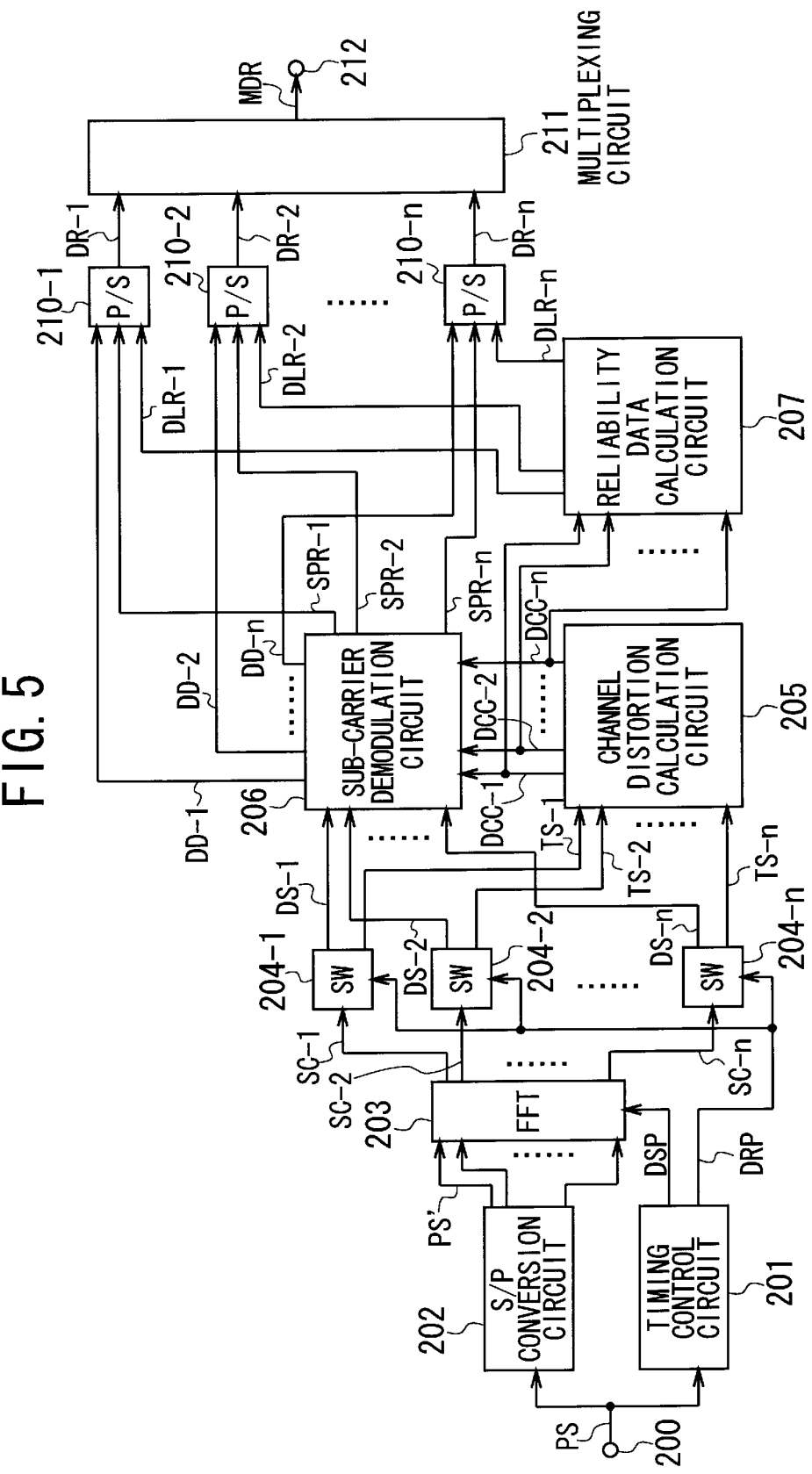
FIG. 5 is a functional block diagram showing the configuration of a receiver according to a second embodiment of the invention, in which the device of outputting a demodulation result in soft-decision decoding according to the first embodiment of FIG. 2 is used.

FIG. 5 shows a receiver designed for the Orthogonal Frequency Division Multiplexing (OFDM) system according to a second embodiment of the invention, in which the device of outputting a demodulation result in soft-decision decoding according to the first embodiment is used. In this receiver, a received signal RS contains n multiplexed sub-carriers.

As shown in FIG. 5, the OFDM type receiver is comprised of an input terminal 200, a timing control circuit 201, a serial-parallel conversion circuit 202, a Fast Fourier Transformation (FFT) circuit 203, n switches 204-1 to 204-n, a channel distortion operation circuit 205, a sub-carrier demodulation circuit 206, a reliability data calculation circuit 207, n parallel-serial conversion circuit 210-1 to 210-n, a multiplexing circuit 211, and an output terminal 212, where n is an integer greater then unity (i.e., $n \geq 2$).

Figure 9:
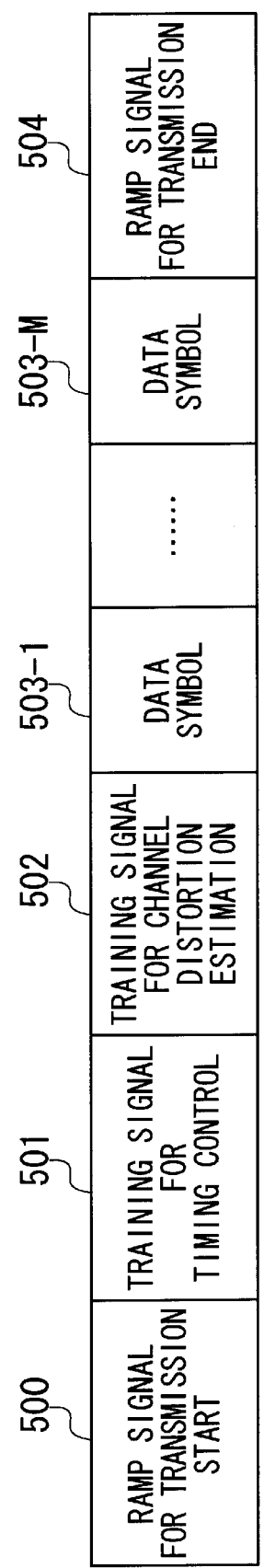
FIG. 9 is a schematic view showing the format of packets having M data symbols, which is received by the receiver according to the second embodiment of FIG. 5.

The received signal RS has a format of packets as shown in FIG. 9. This format includes M data symbols 503-1 to 503-M, where M is an integer greater then unity (i.e., $M \geq 2$). This format further includes a ramp signal 500 for indicating the transmission start, a training signal 501 for timing control, a training signal 502 for estimating the channel distortion, and a ramp signal 504 for indicating transmission end.

When the receiver of FIG. 5 receives the signal RS with the packet format shown in FIG. 9, the signal RS is supplied to the timing control circuit 201 and the serial-parallel conversion circuit 202. The circuit 202 converts the serial data containing sample values forming the respective data symbols 503-1 to 503-M to parallel data signals PS' to the FFT circuit 203.

The FFT circuit 203 performs the Fourier transformation with respect to the parallel data signals PS' while using the pulse DSP for starting the channel-distortion detection sent from the timing control circuit 201 as a trigger signal. Thus, the circuit 203 separates the n sub-carriers contained in the parallel data signals PS' and outputs them to the switches 204-1 to 204-n, respectively.

The timing control circuit 201 has in advance a reference signal whose content corresponds to that of the training signal 501 in the signal RS (see FIG. 9). Then, the circuit 201 compares the content of the training signal 501 in the signal RS with that of the training signal stored previously, generating the correlation data. The circuit 201 defines the timing at which the value of the correlation data exceeds the previously-determined threshold value as the receiving time of the training signal 501.

Then, the timing control circuit 201 calculates the timing at which the receipt of the training signal 502 for channel-distortion estimation, thereby outputting pulses DSP for starting the channel-distortion detection to the FFT circuit 203 according to the timing thus calculated. Moreover, the circuit 201 calculates the timing at which the first data symbol 503-1 is received, thereby outputting pulses DRP for receiving the data symbols to the switches 204-1 to 204-n according to the timing thus calculated.

The initial states of the switches 204-1 to 204-n are set in such a way that their input signals are sent to the channel distortion calculation circuit 205. Thus, the training signal components TS-1 to TS-n for channel distortion estimation of the sub-carriers SC-1 to SC-n are supplied to the circuit 205.

When the pulses for receiving the data symbols are supplied to the switches 204-1 to 204-n, the destination of their input signals are switched to the sub-carrier demodulation circuit 206. Thus, the data symbol components DS-1 to DS-n of the sub-carriers SC-1 to SC-n are supplied to the circuit 206.

The channel distortion calculation circuit 205 calculates the channel distortion occurring in the individual sub-carriers SC-1 to SC-n from the training signal components TS-1 to TS-n of the sub-carriers SC-1 to SC-n. Then, the circuit 206 outputs the compensation coefficients (i.e., the sub-carrier compensation coefficients) to the sub-carrier demodulation circuit 206 and the reliability data calculation circuit 207.

Figure 6:
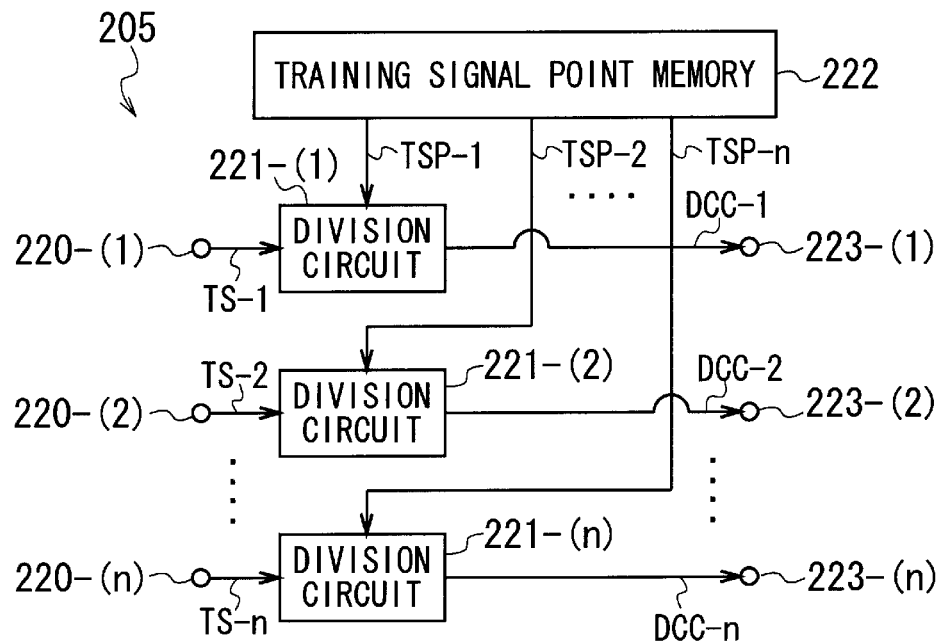
FIG. 6 is a functional block diagram showing the configuration of the communication channel distortion operation circuit used in the receiver according to the second embodiment of FIG. 5.

FIG. 6 shows an example of the configuration of the channel distortion calculation circuit 205 used in the receiver of FIG. 5.

The channel distortion calculation circuit 205 comprises n input terminals 220-(1) to 220-(n), n division circuits 221-(1) to 221-(n), a training signal point memory 222, and n output terminals 223-(1) to 223-(n).

The known signal points TSP-1 to TSP-n corresponding respectively to then sub-carriers SC-1 to SC-n have been previously stored in the training signal point memory 222. The division circuits 221-(1) to 221-(n) divide the known signal points TSP-1 to TSP-n by the signal points of the training signal components TS-1 to TS-n of the sub-carriers SC-1 to SC-n, respectively, outputting n division results. The n division results represent the compensation values for compensating the channel distortion of the respective sub-carriers SC1 to SC-n, which are outputted to the output terminals 223-(1) to 223-(n).

Returning to FIG. 4, the sub-carrier demodulation circuit 206 receives the data symbol components DS-1 to DS-n of the sub-carriers SC1 to SC-n from the switches 204-1 to 204-n and the sub-carrier compensation coefficients DCC-1 to DCC-n from the channel distortion calculation circuit 205. Then, the circuit 206 outputs the decision result DD-1 to DD-n for the respective sub-carriers SC-1 to SC-n and the distance-based reliability data SPR-1 to SPR-n to the parallel-serial conversion circuit 210-1 to 210-n, respectively.

Figure 8:
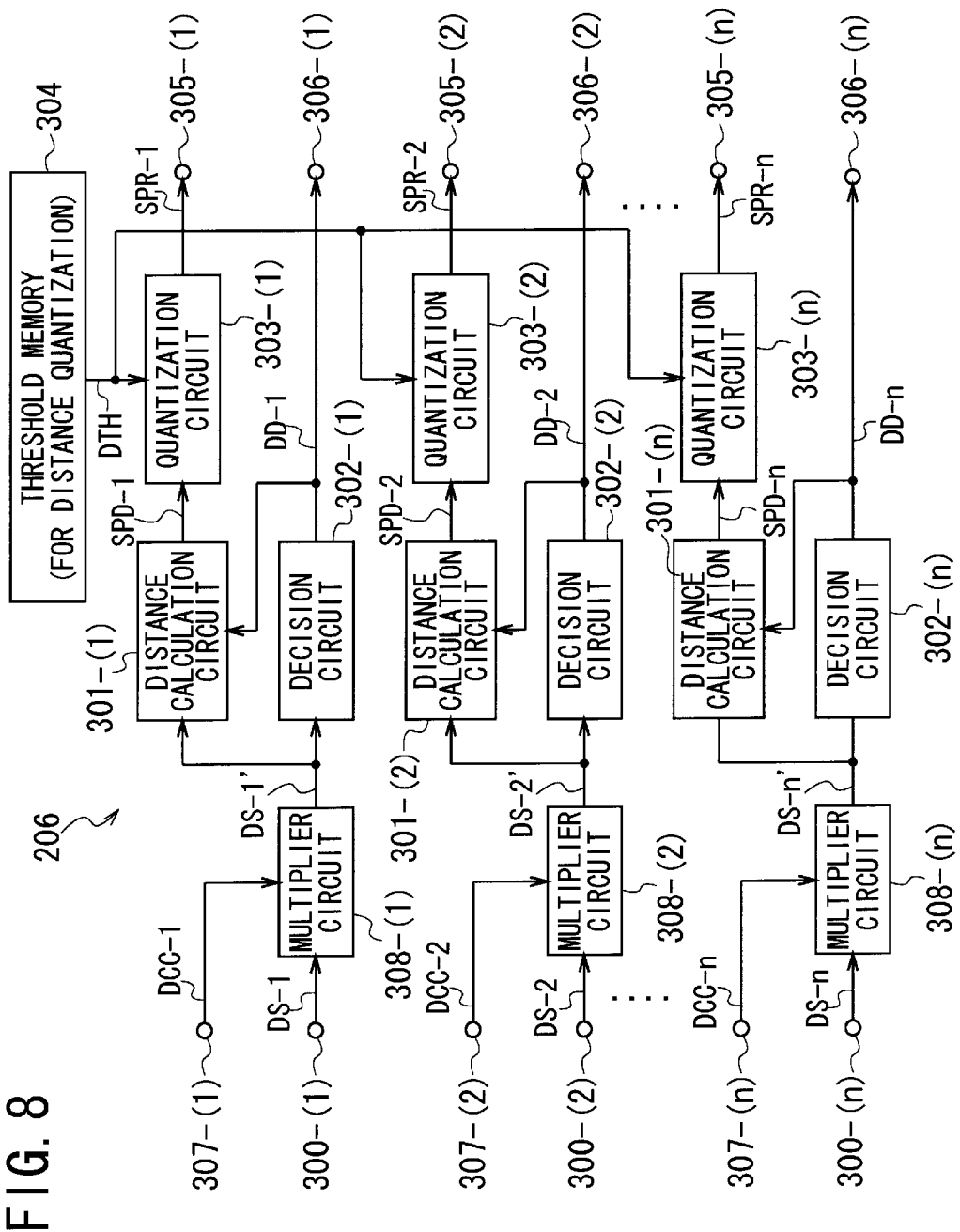
FIG. 8 is a functional block diagram showing the configuration of the sub-carrier demodulation circuit used in the receiver according to the second embodiment of FIG. 5.

FIG. 8 shows an example of the configuration of the sub-carrier demodulation circuit 206 used in the receiver of FIG. 5.

As shown in FIG. 8, the circuit 206 comprises n input terminals 300-(1) to 300-(n), n input terminals 307-(1) to 307-(n), n decision circuits 302-(1) to 302-(n), n distance calculation circuits 301-(1) to 301-(n), n quantization circuits 303-(1) to 303-(n), a distance threshold memory 304, n multiplier circuits 308-(1) to 308-(n), n output terminals 305-(1) to 305-(n), and n output terminals 306-(1) to 306-(n).

The components DS-1 to DS-n of the n sub-carriers SC-1 to SC-n are supplied to the multiplier circuits 308-(1) to 308-(n) through the input terminals 300-(1) to 300-(n), respectively. The sub-carrier compensation coefficients DCC-1 to DCC-n for the n sub-carriers SC-1 to SC-n are supplied to the multiplier circuits 308-(1) to 308-(n) through the input terminals 307-(1) to 307-(n), respectively. Then, the circuits 308-(1) to 308-(n) multiply the components DS-1 to DS-n by the sub-carrier compensation coefficients DCC-1 to DCC-n, generating the output signals DS-1' to DS-n', respectively. Thus, the channel distortion in the sub-carriers SC-1 to SC-n is compensated.

The output signals DS-1' to DS-n' of the multiplier circuits 308-(1) to 308-(n) are supplied to the decision circuits 302-(1) to 302-(n) and the distance calculation circuits 301-(1) to 301-(n), respectively. The decision circuits 302-(1) to 302-(n) make decision about the applied output signals DS-1' to DS-n' of the multiplier circuits 308-(1) to 308-(n) using the soft-decision technique, there by outputting the decision data DD-1 to DD-n to the distance calculation circuits 301-(1) to 301-(n) and the output terminals 306-(1) to 306-(n), respectively.

The distance calculation circuits 301-(1) to 301-(n) perform the mapping operation of the decision data DD-1 to DD-n of the decision circuits 302-(1) to 302-(n). Then, the circuits 301-(1) to 301-(n) calculate the distances SPD-1 to SPD-n between the signal points thus mapped and the output signals DS-1' to DS-n' of the multiplier circuits 308-(1) to 308-(n), thereby supplying the distances SPD-1 to SPD-n to the quantization circuits 303-(1) to 303-(n), respectively.

The quantization circuits 303-(1) to 303-(n) quantize the distances SPD-1 to SPD-n using the threshold values DTH stored in the threshold memory 304, outputting the distance-based reliability data SPR-1 to SPR-n about the decision results DD of the respective sub-carriers SC-1 to SC-n toward the output terminals 305-(1) to 305-(n), respectively. As seen from FIG. 5, the distance-based reliability data SPR-1 to SPR-n thus outputted are supplied to the parallel-serial conversion circuit 210-1 to 210-n, respectively.

The shorter the distances SPD-1 to SPD-n become, the higher the reliability becomes.

Returning to FIG. 5, the reliability data calculation circuit 207 receives the sub-carrier compensation coefficients DCC-1 to DCC-n from the channel distortion calculation circuit 205, outputting the level-based reliability data DLR-1 to DLR-n.

Figure 7:
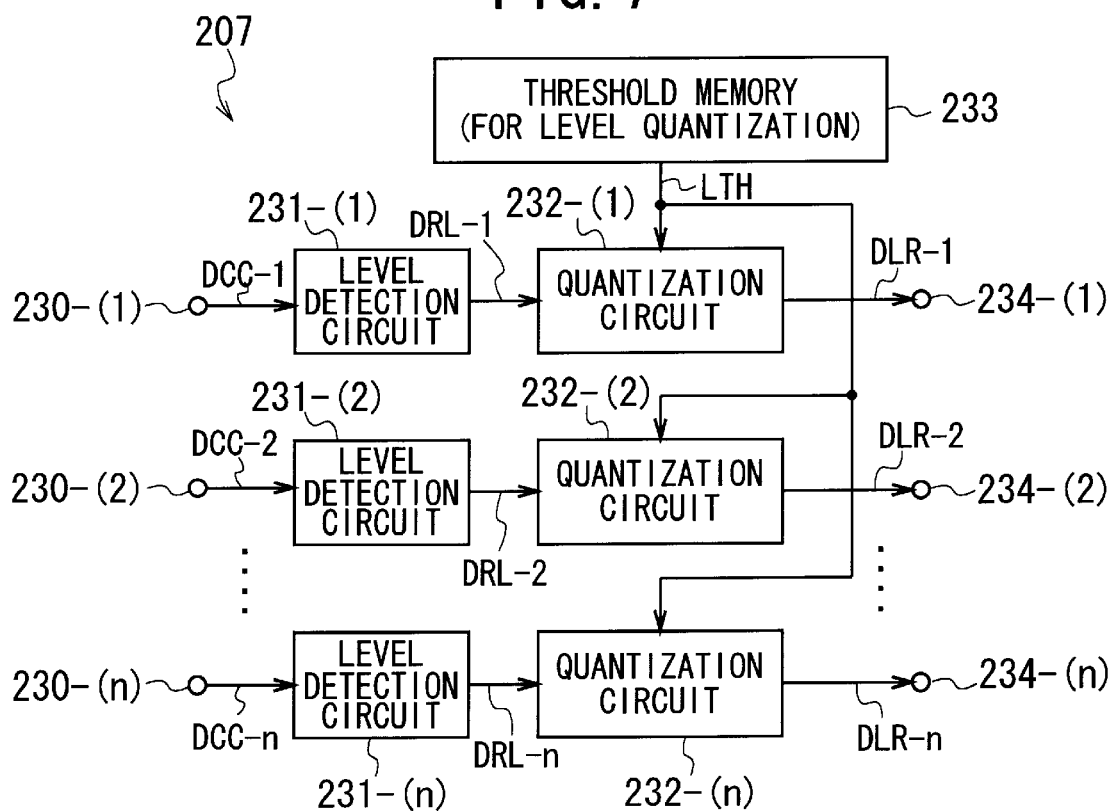
FIG. 7 is a functional block diagram showing the configuration of the reliability data operation circuit used in the receiver according to the second embodiment of FIG. 5.

FIG. 7 shows an example of the configuration of the reliability data calculation circuit 207 used in the receiver of FIG. 5.

As shown in FIG. 7, the circuit 207 comprises n input terminals 230-(1) to 230-(n), n level detection circuits 231-(1) to 231-(n), n quantization circuits 232-(1) to 232-(n), a threshold memory 233, and n output terminals 234-(1) to 234-(n).

The sub-carrier compensation coefficients DCC-1 to DCC-n, which are sent from the channel distortion calculation circuit 205, are supplied to the level detection circuits 231-(1) to 231-(n) through the input terminals 230-(1) to 230-(n), respectively. Thus, the circuits 231-(1) to 231-(n) detect the level of the sub-carrier compensation coefficients DCC-1 to DCC-n, outputting the level data DRL-1 to DRL-n, respectively. The level data DRL-1 to DRL-n thus detected are sent to the quantization circuits 232-(1) to 232-(n) and then, quantized according to the threshold values LTH stored in the threshold memory 233, respectively. The quantized level data DLR-1 to DLR-n thus obtained are outputted through the output terminals 234-(1) to 234-(n) to the parallel-serial conversion circuits 210-1 to 210-n as the level-based reliability information, respectively.

The lower the levels of the compensation coefficients DCC-1 to DCC-n of the sub-carriers SC-1 to SC-n become, the higher the reliability of the decision results DD-1 to DD-n becomes.

Returning to FIG. 5, the parallel-serial conversion circuits 210-1 to 210-n are supplied with the decision results DD-1 to DD-n, the distance-based reliability information SPR-1 to SPR-n from the sub-carrier demodulation circuit 206, and the level-based reliability information DLR-1 to DLR-n from the reliability data calculation circuit 207. Then, the circuits 210-1 to 210-n convert these data DD-1 to DD-n, SPR-1 to SPR-n, and DLR-1 to DLR-n sent in parallel to n serial data DR-1 to DR-n, respectively. As a result, the demodulation results DR-1 to DR-n for the sub-carriers SC-1 to SC-n, which are applicable to the subsequent decoding operation, are supplied to the multiplexing circuit 211.

The multiplexing circuit 211 multiplexes the demodulation results DR-1 to DR-n for the sub-carriers SC-1 to SC-n and outputs a multiplexed demodulation result MDR containing the results DR-1 to DR-n to the output terminal 212.

With the receiver according to the second embodiment, as described above, the device of outputting a demodulation result in soft-decision decoding according to the first embodiment of FIG. 2 is used. Thus, an enhanced decoding capability of error-correcting codes can be realized.

In the above-explained second embodiment, the distance-based reliability data SPR-1 to SPR-n are outputted, as shown in FIG. 8. However, the invention is not limited thereto. The invention is applicable to any configuration outputting no distance-based reliability information or data.

While the preferred forms of the present invention have been described, it is to be understood that modifications will be apparent to those skilled in the art without departing from the spirit of the invention. The scope of the present invention, therefore, is to be determined solely by the following claims.

What is claimed is:

1. A receiver comprising:
   (a) a demodulation circuit for outputting n decision results corresponding to n frequency-multiplexed sub-carriers of a received signal by demodulating said n sub-carriers and deciding said n sub-carriers thus demodulated using a soft decision technique, where n is an integer greater than unity;
   said n decision results being generated by using n channel-distortion coefficients corresponding to said n sub-carriers;
   (b) a channel-distortion calculation circuit for calculating said n channel-distortion coefficients corresponding to said n sub-carriers;
   (c) a reliability information calculation circuit for calculating reliability information for said n decision results corresponding to said n sub-carriers using said n channel-distortion coefficients; and
   (d) a demodulation result output circuit for outputting a demodulation result using said n decision results corresponding to said n sub-carriers and said reliability information corresponding to said n sub-carriers.

2. The receiver according to claim 1, wherein said channel-distortion circuit comprises:
   a training signal point memory for storing training signal point corresponding to n reference training signal points corresponding to the n sub-carriers; and
   n division circuits for respectively dividing n training signal points of the n sub-carriers by the n reference training signal points to thereby output the n channel-distortion coefficients.

3. The receiver according to claim 1, wherein said reliability information calculator circuit comprises:
   n level detection circuits for detecting respective levels of said n channel-distortion coefficients;
   a threshold memory for storing threshold values for quantizing the reliability with respect to the level of said n channel-distortion coefficients; and
   n quantization circuits for quantizing outputs of said n level detection circuits using said threshold values, thereby outputting reliability information corresponding to said n decision results.

4. The receiver according to claim 1, wherein said demodulation circuit outputs said n decision results corresponding to said n sub-carriers and n pieces of distance reliability information as reliability information for said n decision results.

5. The receiver according to claim 1, wherein said demodulation circuit comprises:
   n multiplier circuits for multiplying said n sub-carriers by said n channel-distortion coefficients;
   n decision circuits for outputting said n decision results using outputs of said n multiplier circuits;
   n distance calculation circuits for calculating a distance between said n decision results and said outputs of said n multiplier circuits in a signal space;
   a threshold memory for storing threshold values for quantizing said outputs of said n distance calculation circuits; and
   n quantization circuits for quantizing said outputs of said n distance calculation circuits using said threshold values stored in said threshold memory and said outputs of said n distance calculation circuits, thereby outputting distance reliability information as said reliability information for said n decision results.

* * * * *